United States Patent
Park et al.

(10) Patent No.: US 9,310,532 B2
(45) Date of Patent: Apr. 12, 2016

(54) VARIABLE FRESNEL LENS

(71) Applicant: ELECTRONICS AND TELECOMMUNICATIONS RESEARCH INSTITUTE, Daejeon (KR)

(72) Inventors: Sun Tak Park, Daejeon (KR); Ki Uk Kyung, Seoul (KR); Bong Je Park, Daejeon (KR); Sung Ryul Yun, Daejeon (KR); Sae Kwang Nam, Daegu (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 99 days.

(21) Appl. No.: 14/245,245

(22) Filed: Apr. 4, 2014

(65) Prior Publication Data

US 2015/0116815 A1    Apr. 30, 2015

(30) Foreign Application Priority Data

Oct. 29, 2013  (KR) .................. 10-2013-0129363

(51) Int. Cl.
 G02B 26/00 (2006.01)
 G02B 3/08 (2006.01)
 G02B 3/14 (2006.01)

(52) U.S. Cl.
 CPC .. G02B 3/08 (2013.01); G02B 3/14 (2013.01); G02B 26/004 (2013.01)

(58) Field of Classification Search
 USPC .................................... 359/290–298
 See application file for complete search history.

(56) References Cited

U.S. PATENT DOCUMENTS

| 5,069,813 | A | * | 12/1991 | Patel | .......................... G02F 1/29 252/299.01 |
| 7,136,227 | B2 | | 11/2006 | Li | |
| 8,883,954 | B2 | * | 11/2014 | Byrne | ........................... 526/240 |
| 2006/0279848 | A1 | * | 12/2006 | Kuiper | ..................... G02B 3/08 359/666 |
| 2008/0259416 | A1 | * | 10/2008 | Peters | ....................... G02B 5/18 359/2 |
| 2013/0167929 | A1 | * | 7/2013 | Wen | ........................ B82Y 10/00 136/263 |

FOREIGN PATENT DOCUMENTS

| JP | 2007-057716 A | 3/2007 |
| KR | 10-2009-0009616 A | 1/2009 |
| KR | 10-2012-0014408 | 2/2012 |
| KR | 10-2012-0130406 | 12/2012 |
| KR | 10-1205519 | 12/2012 |
| WO | WO-2006/078806 A2 | 7/2006 |

\* cited by examiner

*Primary Examiner* — Mohammed Hasan
(74) *Attorney, Agent, or Firm* — Rabin & Berdo, P.C.

(57) ABSTRACT

Disclosed is a variable Fresnel lens, including: an electric active polymer layer of which a form is deformed by an electric field; and a Fresnel lens coupled to an upper portion of the electric active polymer layer, and configured to change a position of a focus according to deformation of the form of the electric active polymer layer.

20 Claims, 7 Drawing Sheets

VARIABLE FRESNEL LENS

CROSS-REFERENCE TO RELATED APPLICATION

This application is based on and claims priority from Korean Patent Application No. 10-2013-0129363, filed on Oct. 29, 2013, with the Korean Intellectual Property Office, the disclosure of which is incorporated herein in its entirety by reference.

BACKGROUND

1. Field

The present invention relates to a lens, and more particularly, to a variable Fresnel lens capable of changing a distance and a position of a focus in real time.

2. Discussion of Related Art

A Fresnel lens is a lens which serves as a convex lens but is decreased in a thickness. In order to decrease the thickness of the lens, the Fresnel lens is divided in a shape of plural bands. The Fresnel lens is utilized in various fields, such as a light house, a taillight of a vehicle, a camera, an optical system projector, and a solar battery, and has various sizes from several meters (m) to several micrometers (μm).

In a general Fresnel lens, a plurality of circular bands is periodically formed. The Fresnel lens has a structure in which intervals between circles positioned far from a circle positioned at a center are decreased. A focus of the Fresnel having the aforementioned structure is formed at a fixed position, so that there is a problem in that a position of the focus cannot be changed.

SUMMARY

The present invention has been made in an effort to provide a variable Fresnel lens capable of changing a distance and a position of a focus in real time.

An embodiment of the present invention provides a variable Fresnel lens, including: an electric active polymer layer of which a form is deformed by an electric field; and a Fresnel lens coupled to an upper portion of the electric active polymer layer, and configured to change a position of a focus according to deformation of the form of the electric active polymer layer, wherein the electric active polymer layer includes: an electric active polymer of which a form is deformed by the electric field; and transparent electrodes formed on an upper portion and a lower portion of the electric active polymer, and transformed by transformation of the form of the electric active polymer, and the Fresnel lens is coupled to the transparent electrode positioned on the upper portion among the transparent electrodes.

In the present exemplary embodiment, the Fresnel lens may have a flexible structure deformed according to a change in the form of the electric active polymer layer.

In the present exemplary embodiment, the Fresnel lens may further include a supporter formed on a lateral surface of the electric active polymer layer, and maintaining a fixed form.

In the present exemplary embodiment, the transparent electrodes may form an electrode pattern for applying the electric field to the electric active polymer layer, and as sizes of unit factors forming the electrode pattern are small, a position of the focus may be precisely changed.

In the present exemplary embodiment, the Fresnel lens may further include an electric field generator configured to apply the electric field to the transparent electrodes, wherein the electric field generator may receive an external control signal for controlling the change in the position of the focus, and include a control circuit configured to control a generation position of the electric field according to the external control signal.

In the present exemplary embodiment, the electric active polymer may include a dielectric elastomer having a transparent property.

In the present exemplary embodiment, the transparent electrode may include at least one of an Indium-Tin Oxide (ITO), a carbon nanotube, silver nanowires, graphene, and a conducting polymer.

Another embodiment of the present invention provides a variable Fresnel lens, including: an electric active polymer of which a form is deformed by an electric field; a first transparent electrode formed on an upper portion of the electric active polymer, and transformed by transformation of the form of the electric active polymer, and a second transparent electrode form on a lower portion of the electric active polymer; and a Fresnel lens coupled with an upper portion of the first transparent electrode, and configured to change a position of a focus according to deformation of the form of the electric active polymer.

In the present exemplary embodiment, the Fresnel lens may have a flexible structure deformed according to a change in the form of the electric active polymer.

In the present exemplary embodiment, the electric active polymer may include a dielectric elastomer having a transparent property.

In the present exemplary embodiment, each of the first transparent electrode and the second transparent electrode may include at least one of an Indium-Tin Oxide (ITO), a carbon nanotube, silver nanowires, graphene, and a conducting polymer.

Yet another embodiment of the present invention provides a variable Fresnel lens, including: an electric active polymer of which a form is deformed by an electric field; a first transparent electrode formed on an upper portion of the electric active polymer, and transformed by transformation of the form of the electric active polymer, and a second transparent electrode formed on a lower portion of the electric active polymer, and transformed by transformation of the form of the electric active polymer, and a Fresnel lens coupled with an upper portion of the first transparent electrode, and configured to change a position of a focus according to a change in the form of the electric active polymer; and a supporter formed on lateral surfaces of the electric active polymer, the first transparent electrode, and the second transparent electrode, and maintaining a fixed form.

In the present exemplary embodiment, the Fresnel lens has a flexible structure deformed according to a change in the form of the electric active polymer.

In the present exemplary embodiment, the electric active polymer may include a dielectric elastomer having a transparent property.

In the present exemplary embodiment, each of the first transparent electrode and the second transparent electrode may include at least one of an Indium-Tin Oxide (ITO), a carbon nanotube, silver nanowires, graphene, and a conducting polymer.

According to the embodiment of the present invention, the variable Fresnel lens employs an electric active polymer of which a form is deformed by an electric field and a Fresnel lens having a flexible structure, so that it is possible to change a distance and a position of a focus in real time.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The above and other features and advantages of the present invention will become more apparent to those of ordinary skill in the art by describing in detail embodiments thereof with reference to the attached drawings in which.

DETAILED DESCRIPTION

Hereinafter, an embodiment of the present invention will be described with reference to the accompanying drawings in detail. However, the present invention is not limited to an embodiment disclosed below and may be implemented in various forms and the scope of the present invention is not limited to the following embodiments. Rather, the embodiment is provided to more sincerely and fully disclose the present invention and to completely transfer the spirit of the present invention to those skilled in the art to which the present invention pertains, and the scope of the present invention should be understood by the claims of the present invention.

The present invention provides a variable Fresnel lens capable of changing a distance and a position of a focus in real time. The variable Fresnel lens of the present invention induces a shape change of the Fresnel lens by using an electric active polymer to change a characteristic of the Fresnel lens.

Figure 1:
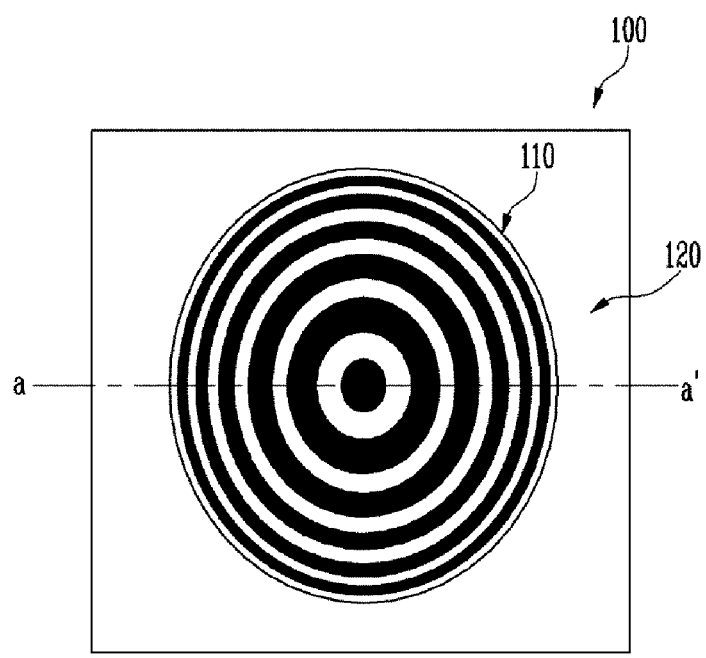
FIG. 1 is a diagram illustrating a variable Fresnel lens according to an exemplary embodiment of the present invention.

FIG. 1 is a diagram illustrating a variable Fresnel lens according to an exemplary embodiment of the present invention.

Referring to FIG. 1, the variable Fresnel lens 100 includes a Fresnel lens 110 and an electric active polymer layer 120.

The Fresnel lens 110 is a lens which has a function of a convex lens, and has a decreased thickness. The Fresnel lens 110 is coupled with the electric active polymer layer 120, and has a flexible structure so as to be deformed by a deformation of the electric active polymer layer 120. Further, the Fresnel lens 110 forms a focus by input light.

The electric active polymer layer 120 has a transparent structure so as to allow light to pass through, and includes an electric active polymer. Here, the electric active polymer is a material of which a shape is deformed by an applied electric field. The shape of the electric active polymer layer 120 is deformed by the electric active polymer, and the coupled Fresnel lens 110 is also deformed. Accordingly, a distance and a position of the focus formed by the Fresnel lens 110 may be changed.

Figure 2:
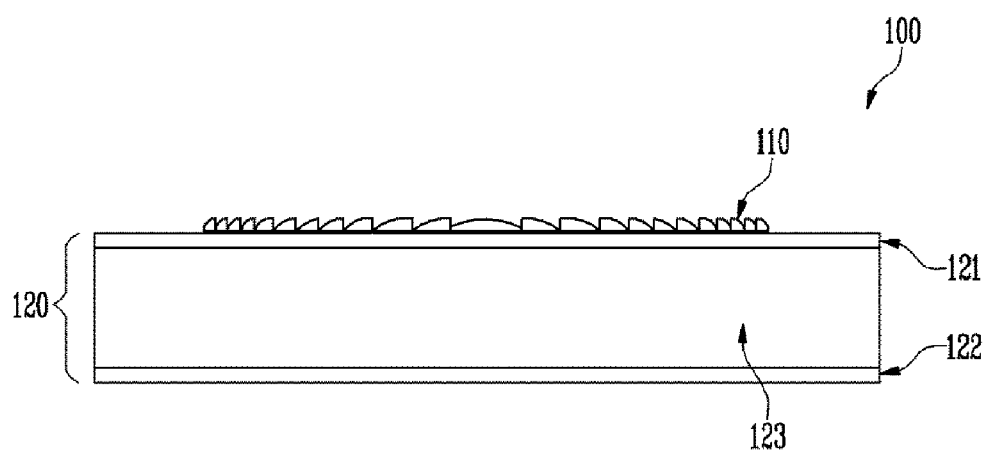
FIG. 2 is a diagram illustrating a lateral side of the variable Fresnel lens of FIG. 1.

FIG. 2 is a diagram illustrating a lateral side of the variable Fresnel lens of FIG. 1.

FIG. 2 illustrates a cross-section of the variable Fresnel lens 100 taken along axis a-a' illustrated in FIG. 1.

The variable Fresnel lens 100 includes the Fresnel lens 110 and the electric active polymer layer 120.

The Fresnel lens 110 is coupled with an upper end of the electric active polymer layer 120. The Fresnel lens 110 is formed in a form of a thin film, and may be formed of a flexible material deformable according to a shape deformation of the electric active polymer layer 120.

The electric active polymer layer 120 includes transparent electrodes 121 and 122 and an electric active polymer 123.

The transparent electrode 121 is positioned on an upper portion of the electric active polymer 123. The Fresnel lens 110 is coupled on the transparent electrode 121. In this case, the transparent electrode 121 is deformed together with the Fresnel lens 110 by deformation of the electric active polymer 123.

Further, the transparent electrode 122 is positioned on a lower portion of the electric active polymer 123.

The transparent electrodes 121 and 122 have flexible structures. That is, the transparent electrodes 121 and 122 are formed of a material which is not cut by deformation due to expansion and contraction and is capable of maintaining an electrical characteristic. Accordingly, the transparent electrodes 121 and 122 may be formed of various materials, such as Indium Tin Oxide (ITO), carbon nanotube, Ag-nanowires, grapheme, and conducting polymer.

A form (for example, a shape or a thickness) of the electric active polymer 123 is changed by the electric field applied through the transparent electrodes 121 and 122. Accordingly, the electric active polymer 123 may be formed of a material, such as a dielectric elastomer having a transparent property.

As described above, the variable Fresnel lens 100 suggested in the present invention uses the electric active polymer layer 120 of which the form is changed by the electric field and the Fresnel lens 110 having a flexible structure coupled with the electric active polymer layer 120. Accordingly to the variable Fresnel lens 100 of the present invention, it is possible to change a distance and a position of the focus formed by the variable Fresnel lens 100 in real time.

Further, the variable Fresnel lens 100 suggested in the present invention is formed by coupling the Fresnel lens 110 having a thin film shape and the electric active polymer layer 120 formed of three layers 121, 122, and 123. Accordingly, the variable Fresnel lens 100 of the present invention may have a miniaturized structure.

Figure 3:
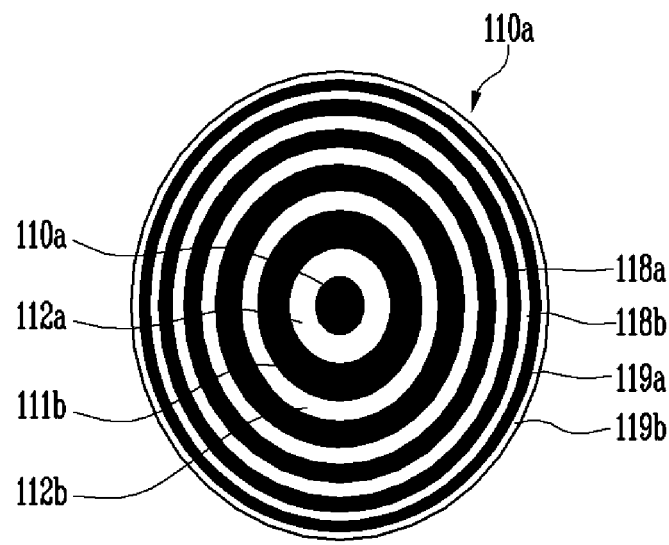
FIG. 3 is a diagram illustrating a Fresnel lens according to an exemplary embodiment of the present invention.

FIG. 3 is a diagram illustrating a Fresnel lens according to an exemplary embodiment of the present invention.

Referring to FIG. 3, in a Fresnel lens 110a, a plurality of circular bands 111a, 112a, 118a, and 119a formed from the center of the Fresnel lens 110a. The plurality of circular bands 111a, 112a, 118a is periodically formed, and have a form in which an interval between the circular bands is decreased as the circular band becomes far from the center of the circular Fresnel lens 110a. For example, it can be seen that an interval between the circular bands 118a and 119a positioned relatively far from the center of the Fresnel lens 110a is smaller than an interval between the circular bands 111a and 112a positioned close to the center of the Fresnel lens 110a.

A cycle of the circular bands formed in the Fresnel lens 110a may be changed according to a focal distance of the Fresnel lens 110a. That is, as the focal distance is short, the interval between the circular bands is decreased.

As described above, in the Fresnel lens 110a, the circular bands (for example, the circular bands 111b, 112b, 118b, and 119b, indicated with a white color in the drawing) through which light passes through and the circular bands (for example, the circular bands 111a, 112a, 118a, and 119a, indicated with a black color in the drawing) through which light does not pass through may be periodically formed. Further, as one of other forms of the Fresnel lens 110a, two different phases may be periodically formed like the circular bands formed on a surface of the Fresnel lens 110a.

Figure 4:
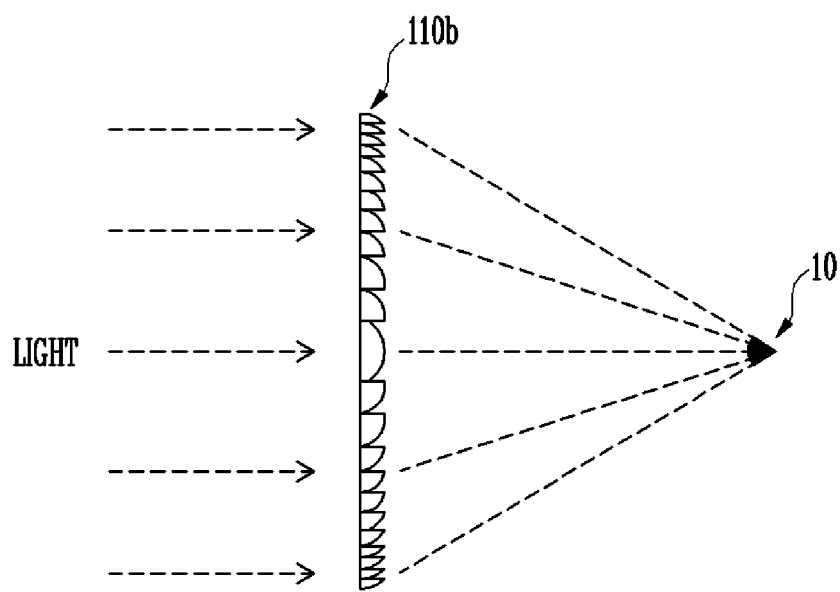
FIG. 4 is a diagram illustrating a lateral side of a Fresnel lens according to an exemplary embodiment of the present invention.

FIG. 4 is a diagram illustrating a lateral side of a Fresnel lens according to another exemplary embodiment of the present invention.

Referring to FIG. 4, a Fresnel lens 110b may have a circular shape, and a cross-section of a lateral side is illustrated. In the Fresnel lens 110b, a concave-convex portion shaped like a curved surface may be formed for each cycle. In the drawing, it can be seen that the concave-convex portions formed in the Fresnel lens 110b is formed in a curved line shaped like a semicircle and a sector.

Here, in the Fresnel lens 110b, an interval between the concave-convex portions may be changed according to a focal distance, and as the focal distance is shorter, a cycle of the concave-convex portions is gradually decreased.

The Fresnel lens 110b forms a focus 10 at a predetermined distance from the Fresnel lens 110b by refraction and diffraction of incident light. That is, the Fresnel lens 110a described with reference to FIG. 3 may also form a focus at a uniform distance similar to the Fresnel lens 110b of FIG. 4.

As described in FIGS. 3 and 4, the variable Fresnel lens 100 of the present invention may adopt all of the Fresnel lens 110a and 110b having a structure, in which the periodical bands allow the light to pass through or block the light, a structure, in which the periodical bands have different two phases, and a structure, in which the periodical bands have a shape of a curved surface, as the Fresnel lens 110.

FIGS. 5A to 5D are diagrams illustrating a focus change when an electric field is applied to the variable Fresnel lens of FIG. 1.

Figure 5A:
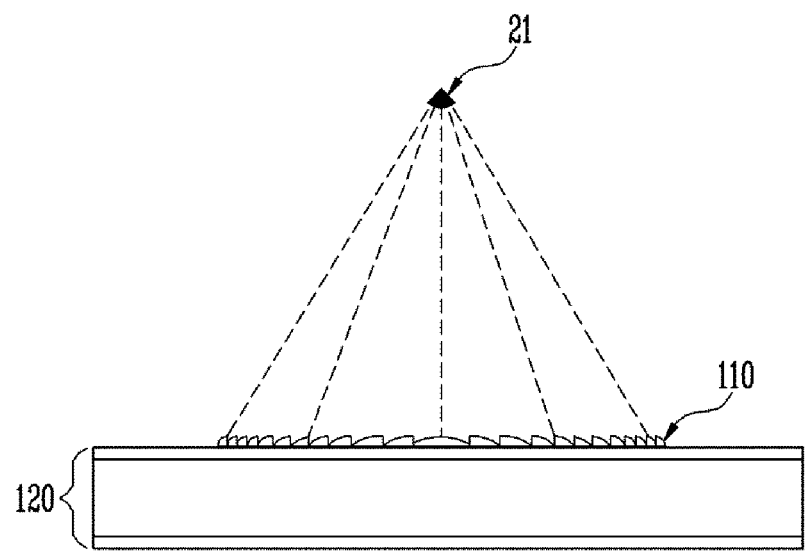
FIGS. 5A to 5D are diagrams illustrating a focus change when an electric field is applied to the variable Fresnel lens of FIG. 1.

Referring to FIG. 5A, a case in which an electric field is not applied to the electric active polymer layer 120 is illustrated. When the electric field is not applied, a focus 21 is formed by the Fresnel lens 110.

Figure 5B:
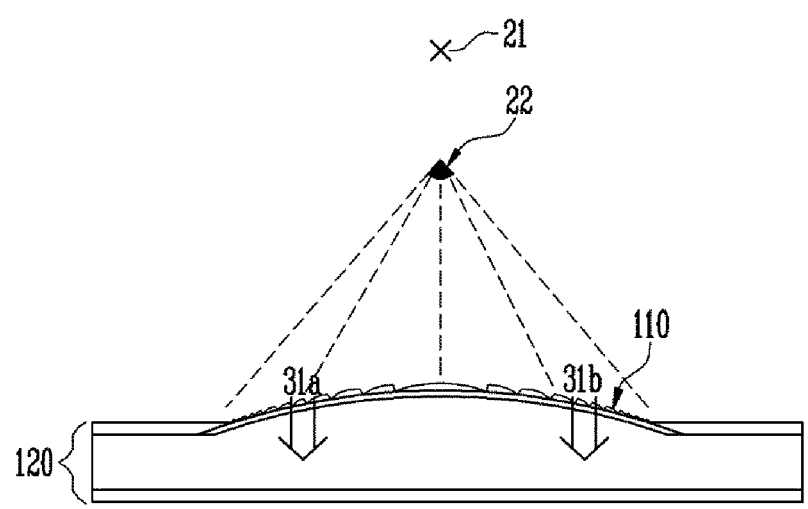

Referring to FIG. 5B, a case in which electric fields 31a and 31b are applied based on an edge of the electric active polymer layer 120 is illustrated. The electric active polymer layer 120 may be convexly formed based on the center of the Fresnel lens 110 to which the electric field is not applied. The Fresnel lens 110 is deformed in a convex shape together with the electric active polymer layer 120 by the electric active polymer layer 120. In this case, a focus 22 of the Fresnel lens 110 is positioned at a close place to the Fresnel lens 110 based on the focus 21 of FIG. 5A (when the electric field is not applied).

Figure 5C:
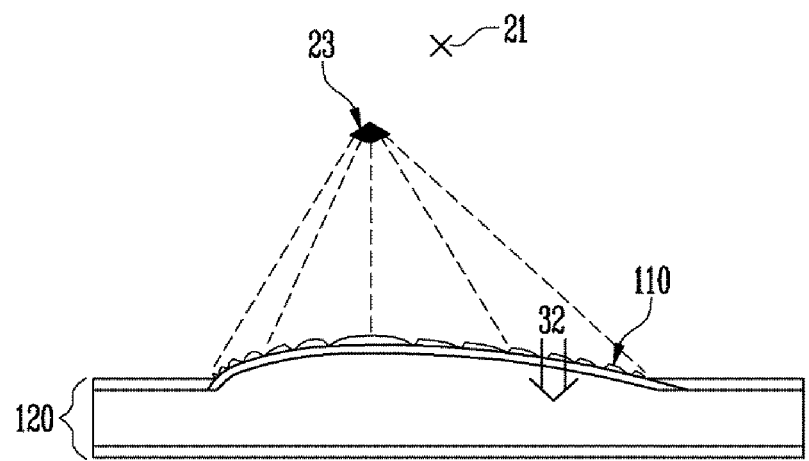

Referring to FIG. 5C, a case in which an electric field 32 is asymmetrically applied based on a lateral edge of the electric active polymer layer 120 is illustrated. When the electric field 32 is applied to the right lateral side of the electric active polymer layer 120, the electric active polymer layer 120 may be convexly formed based on a left lateral side to which the electric field 32 is not applied. In this case, the focus 23 of the Fresnel lens 110 is close to the Fresnel lens 110 based on the focus 21 of FIG. 5A, and is positioned at a lateral side (left side) of the Fresnel lens 110.

Figure 5D:
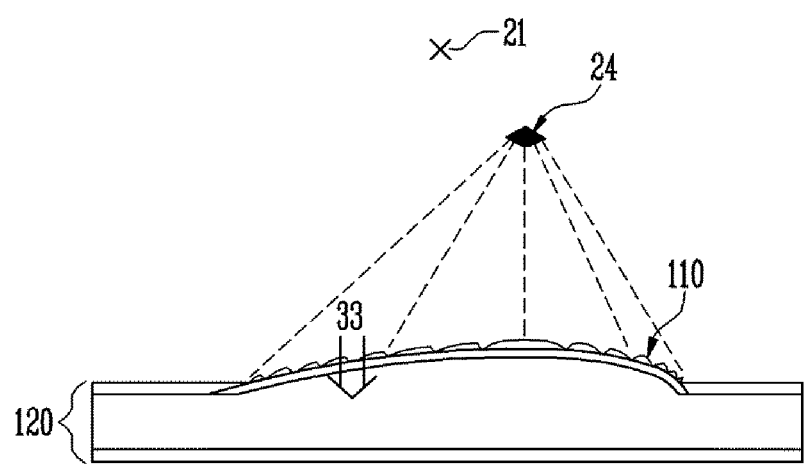

Referring to FIG. 5D, a case in which an electric field 33 is asymmetrically applied based on the lateral edge of the electric active polymer layer 120 is illustrated. When the electric field 33 is applied to the left lateral side of the electric active polymer layer 120, the electric active polymer layer 120 may be convexly formed based on a right lateral side to which the electric field 33 is not applied. In this case, the focus 24 of the Fresnel lens 110 is close to the Fresnel lens 110 based on the focus 21 of FIG. 5A, and is positioned at a lateral side (right side) of the Fresnel lens 110.

As illustrated in FIGS. 5C and 5D, when the electric field is asymmetrically applied to the electric active polymer layer 120, a position of a focus vertical to an optical axis, as well as the focal distance, may be changed in left and right directions.

FIGS. 5a to 5D exemplarily illustrate the positions to which the electric fields 31a, 31b, 32, and 33 are relatively intensively applied. Accordingly, the focus may be formed at various positions according to an intensity of the electric field applied to the electric active polymer layer 120, the form of the electric field, the position to which the electric field is applied, and the like.

Further, an electrode pattern may be formed so as to prevent the transparent electrodes 121 and 122 from being evenly formed on an entire surface of the electric active polymer layer 120. That is, the transparent electrodes 121 and 122 may partially or locally apply the electric field to the electric active polymer layer 120 through a predetermined electrode pattern. Accordingly, the variable Fresnel lens 100 may control so that the focus is more accurately formed at a desired position.

The electrode pattern formed in the transparent electrodes 121 and 122 may have a mesh form, like a net, or a form, such as a Thin Film Transistor (TFT), capable of applying an electric field in the unit of a pixel. As described above, as a size of a unit element forming the electrode pattern of the transparent electrodes 121 and 122 is decreased, accuracy for a position change of the focus may be improved.

Figure 6:
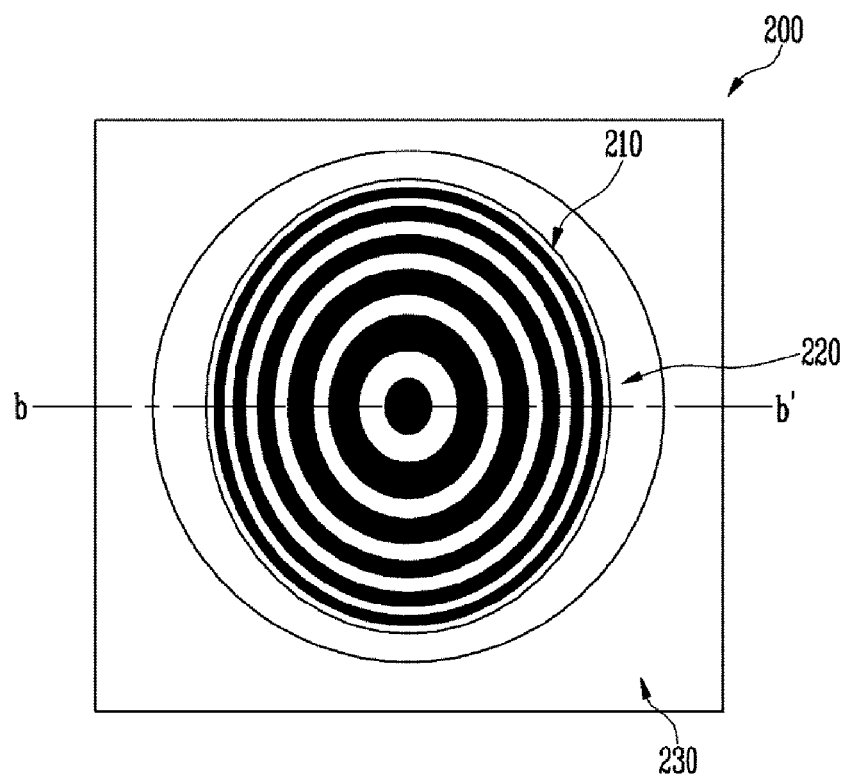
FIG. 6 is a diagram illustrating a variable Fresnel lens implemented by using a supporter according to an exemplary embodiment of the present invention.

FIG. 6 is a diagram illustrating a variable Fresnel lens implemented by using a supporter according to an exemplary embodiment of the present invention;

Referring to FIG. 6, a variable Fresnel lens 200 includes a Fresnel lens 210, an electric active polymer layer 220, and a supporter 230. Here, the variable Fresnel lens 200 has a similar structure to that of the variable Fresnel lens 100 described with reference to FIGS. 1 to 4, and is different from the variable Fresnel lens 100 in that the supporter 230 is additionally included.

Accordingly, the descriptions of the remaining configurations of the variable Fresnel lens 200, except for the structure including the supporter 230, will refer to those of FIGS. 1 to 4.

The Fresnel lens 210 is positioned on the electric active polymer layer 220.

A form of the electric active polymer layer 220 is deformed by an applied electric field, and the electric active polymer layer 220 also changes a form of the Fresnel lens 210 positioned thereon.

The supporter 230 is formed at a lateral side of the electric active polymer layer 220 and maintains a fixed form. The supporter 230 has a structure which is not influenced by deformation of the form of the electric active polymer layer 220.

Figure 7:
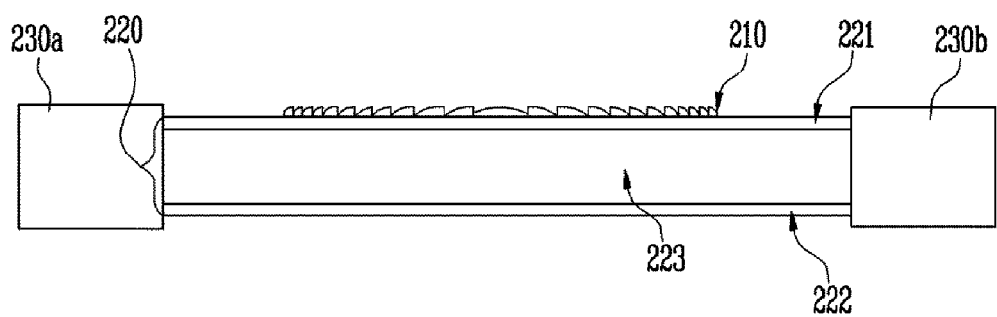
FIG. 7 is a diagram illustrating a lateral side of the variable Fresnel lens of FIG. 6.

FIG. 7 is a diagram illustrating a lateral side of the variable Fresnel lens of FIG. 6.

FIG. 7 illustrates a cross-section of the variable Fresnel lens 200 taken along axis b-b' illustrated in FIG. 6. The variable Fresnel lens 200 includes the Fresnel lens 210, the electric active polymer layer 220, and the supporter 230.

The Fresnel lens 210 is coupled with an upper end of the electric active polymer layer 220.

The electric active polymer layer 220 includes transparent electrodes 221 and 222 and an electric active polymer 223.

The transparent electrode 221 is positioned on an upper portion of the electric active polymer 223. The Fresnel lens 210 is coupled with the transparent electrode 221.

Further, the transparent electrode 222 is positioned on a lower portion of the electric active polymer 223.

The supporter 230 having a fixed form has a function of preventing the electric active polymer layer 220 from being expanded to the edge when an electric field is applied to the transparent electrodes 221 and 222 formed on both surfaces of the electric active polymer layer 220. The supporter 230 is formed at the edge, that is, a lateral side, of the electric active polymer layer 220, of the electric active polymer layer 220.

Figure 8A:
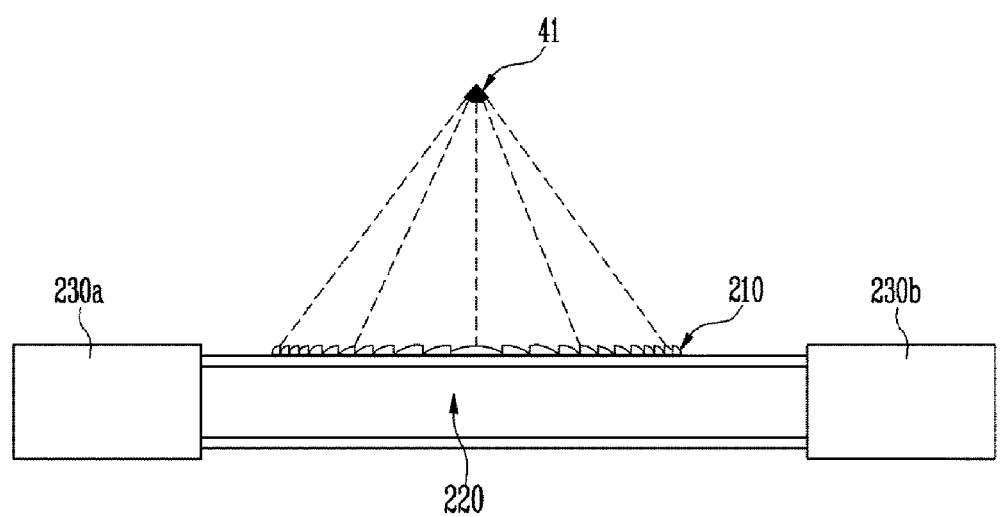
FIGS. 8A to 8C are diagrams illustrating a focus change when an electric field is applied to the variable Fresnel lens of FIG. 6.
Figure 8B:
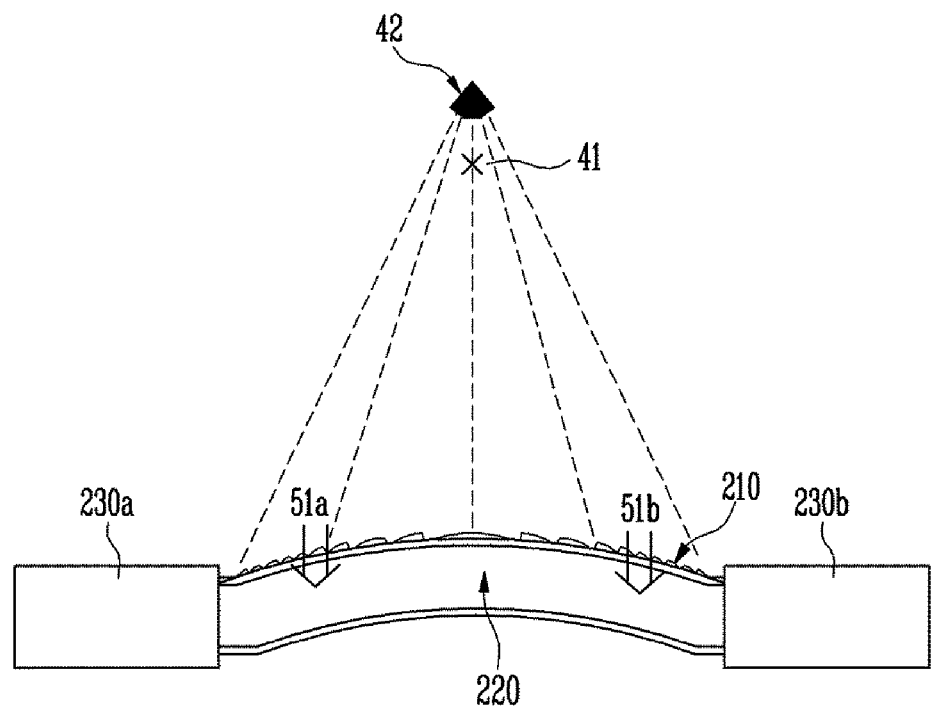
Figure 8C:
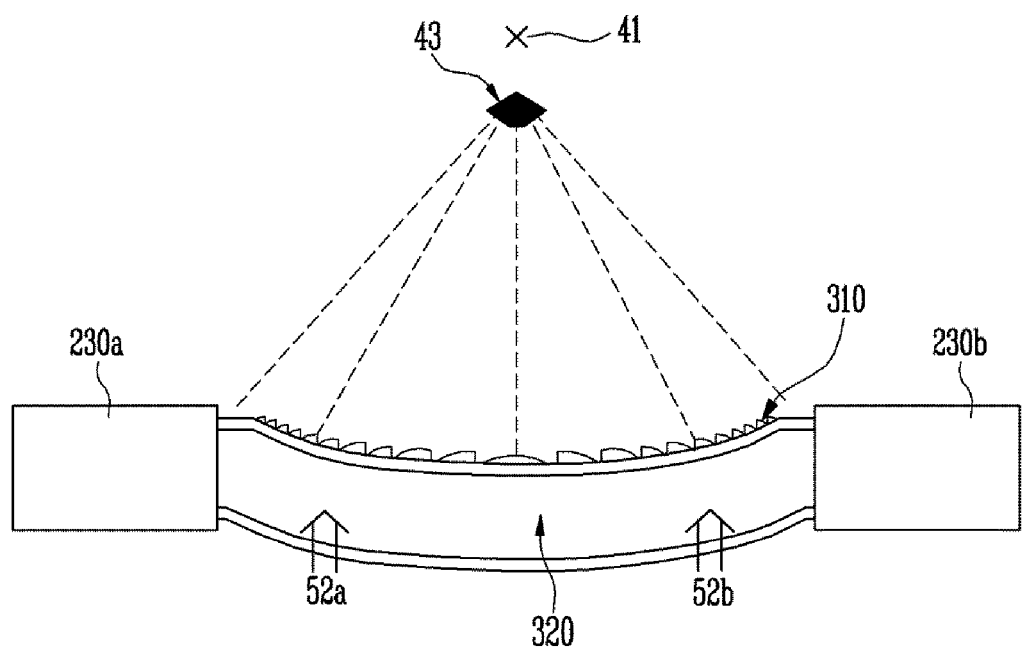

FIGS. 8A to 8C are diagrams illustrating a focus change when an electric field is applied to the variable Fresnel lens of FIG. 6.

Referring to FIG. 8A, a case in which an electric field is not applied to the electric active polymer layer 220 is illustrated. When the electric field is not applied, a focus 41 is formed by the Fresnel lens 210.

Referring to FIG. 8B, a case in which electric fields 51*a* and 51*b* are applied based on an edge of the electric active polymer layer 220 is illustrated. The supporters 230*a* and 230*b* restrict the electric active polymer layer 220 from becoming thin and being expanded in a direction of the edge according to the application of the electric field. Accordingly, the electric active polymer layer 220 is upwardly bent (a direction in which the Fresnel lens 210 is positioned) based on a center of the Fresnel lens 210 to which the electric field is not applied.

In this case, a focal distance of a focus 42 of the Fresnel lens 210 is increased based on the focus 41 of FIG. 8A (when the electric field is not applied). That is, the focus 42 is formed at a place far from the Fresnel lens 210.

Referring to FIG. 8C, a case in which electric fields 52*a* and 52*b* are applied based on an edge of the electric active polymer layer 220 is illustrated. The supporters 230*a* and 230*b* restrict the electric active polymer layer 220 from becoming thin and being expanded in a direction of the edge according to the application of the electric field. Accordingly, the electric active polymer layer 220 is upwardly bent (a direction in which the Fresnel lens 210 is not positioned) based on a center of the Fresnel lens 210 to which the electric field is not applied.

In this case, a focal distance of a focus 43 of the Fresnel lens 210 is decreased based on the focus 41 of FIG. 8A (when the electric field is not applied). That is, the focus 43 is formed at a place far from the Fresnel lens 210.

The transparent electrodes 221 and 222 of the variable Fresnel lens 200 may accurately control a position of the focus by forming the electrode pattern, such as the transparent electrodes 221 and 222 described with reference to FIGS. 5A to 5D.

In FIGS. 8A to 8C, electric fields 51*a*, 51*b*, 52*a*, and 52*b* applied to the electric active polymer layer 220 are illustrative, and may be applied with various intensities and various forms.

In the meantime, the variable Fresnel lens 100 and 200 may additionally include an electric field generator (not illustrated) for applying an electric field to the transparent electrodes 121, 122, 221, and 222. In this case, the electric field generator includes a control circuit controlling a generation position of the electric field according to an external control signal for controlling a focal distance. In a case of the transparent electrode in which the electrode pattern is formed, the control circuit may change the positions of the focuses of the variable Fresnel lens 100 and 200 through control of a size of an electric field supplied through the electrode pattern and the like.

The variable Fresnel lens suggested in the present invention may be implemented by coupling the electric active polymer layer deformed by the electric field and the flexible Fresnel lens on the electric active polymer layer. Accordingly, the variable Fresnel lens may have a miniaturized structure, and may freely change a position of a focus formed by the variable Fresnel lens in real time. Further, the variable Fresnel lens may change a position of the focus in a vertical direction, as well as a horizontal direction, based on an optical axis according to use of the electric active polymer.

Accordingly, the variable Fresnel lens suggested in the present invention may be utilized in various fields, such as an optical device (for example, a cameral, an optical system projector, and a lighting), a device for an industry (for example, a lighthouse and a vehicle), a medical device (for example, a diagnostic device), and a new and regenerable energy device (for example, a solar cell), through a change in a position of a focus.

As described above, the embodiment has been disclosed in the drawings and the specification. The specific terms used herein are for purposes of illustration, and do not limit the scope of the present invention defined in the claims. Accordingly, those skilled in the art will appreciate that various modifications and another equivalent example may be made without departing from the scope and spirit of the present disclosure. Therefore, the sole technical protection scope of the present invention will be defined by the technical spirit of the accompanying claims.

What is claimed is:

1. A variable Fresnel lens, comprising:
an electric active polymer layer of which a form is deformed by an electric field; and
a Fresnel lens coupled to an upper portion of the electric active polymer layer, and configured to change a position of a focus according to deformation of the form of the electric active polymer layer,
wherein the electric active polymer layer includes:
an electric active polymer of which a form is deformed by the electric field; and
transparent electrodes formed on an upper portion and a lower portion of the electric active polymer, and transformed by transformation of the form of the electric active polymer, and
the Fresnel lens is coupled to the transparent electrode positioned on the upper portion among the transparent electrodes.

2. The variable Fresnel lens of claim 1, wherein said Fresnel lens has a flexible structure deformed according to a change in the form of the electric active polymer layer.

3. The variable Fresnel lens of claim 1, further comprising:
a supporter formed on a lateral surface of the electric active polymer layer, and maintaining a fixed form.

4. The variable Fresnel lens of claim 1, wherein the transparent electrodes form an electrode pattern for applying the electric field to the electric active polymer layer, and
sizes of unit elements forming the electrode pattern being small to allow a position of the focus to be precisely changed.

5. The variable Fresnel lens of claim 4, further comprising:
an electric field generator configured to apply the electric field to the transparent electrodes,
wherein the electric field generator receives an external control signal for controlling the change in the position of the focus, and includes a control circuit configured to control a generation position of the electric field according to the external control signal.

6. The variable Fresnel lens of claim 1, wherein the electric active polymer includes a dielectric elastomer having a transparent property.

7. The variable Fresnel lens of claim 1, wherein the transparent electrodes include at least one of an Indium-Tin Oxide (ITO), a carbon nanotube, silver nanowires, graphene, and a conducting polymer.

8. The variable Fresnel lens of claim 1, wherein the electric active polymer layer and said Fresnel lens are separate from one another.

9. The variable Fresnel lens of claim 1, wherein a surface of said Fresnel lens deforms in accordance with the deformation of the form of the electric active polymer layer.

10. The variable Fresnel lens of claim 1, wherein a surface of said Fresnel lens deforms in accordance with the deformation of the form of the electric active polymer layer such that the surface transitions from a level state to a curved state.

11. The variable Fresnel lens of claim 1, wherein the electric active polymer has a surface deformed by the electric field so as that the surface transitions from a level state to a curved state.

12. The variable Fresnel lens of claim 11, wherein one of the first and second transparent electrodes deforms with the deformation of the surface of the electric active polymer.

13. A variable Fresnel lens, comprising:
an electric active polymer of which a form is deformed by an electric field;
a first transparent electrode formed on an upper portion of the electric active polymer, and transformed by transformation of the form of the electric active polymer;
a second transparent electrode formed on a lower portion of the electric active polymer; and
a Fresnel lens coupled with an upper portion of the first transparent electrode, and configured to change a position of a focus according to deformation of the form of the electric active polymer.

14. The variable Fresnel lens of claim 13, wherein said Fresnel lens has a flexible structure deformed according to a change in the form of the electric active polymer.

15. The variable Fresnel lens of claim 13, wherein the electric active polymer includes a dielectric elastomer having a transparent property.

16. The variable Fresnel lens of claim 13, wherein each of the first transparent electrode and the second transparent electrode includes at least one of an Indium-Tin Oxide (ITO), a carbon nanotube, silver nanowires, graphene, and a conducting polymer.

17. A variable Fresnel lens, comprising:
an electric active polymer of which a form is deformed by an electric field;
a first transparent electrode formed on an upper portion of the electric active polymer, and transformed by transformation of the form of the electric active polymer;
a second transparent electrode formed on a lower portion of the electric active polymer, and transformed by transformation of the form of the electric active polymer;
a Fresnel lens coupled with an upper portion of the first transparent electrode, and configured to change a position of a focus according to a change in the form of the electric active polymer; and
a supporter formed on lateral surfaces of the electric active polymer, the first transparent electrode, and the second transparent electrode, and maintaining a fixed form.

18. The variable Fresnel lens of claim 17, wherein said Fresnel lens has a flexible structure deformed according to a change in the form of the electric active polymer.

19. The variable Fresnel lens of claim 17, wherein the electric active polymer includes a dielectric elastomer having a transparent property.

20. The variable Fresnel lens of claim 17, wherein each of the first transparent electrode and the second transparent electrode includes at least one of an Indium-Tin Oxide (ITO), a carbon nanotube, silver nanowires, graphene, and a conducting polymer.

* * * * *